R. R. LIVINGSTON.
COMBINED CAMERA CASING AND FILM CARRIER.
APPLICATION FILED JULY 25, 1913.
1,090,079.
Patented Mar. 10, 1914.
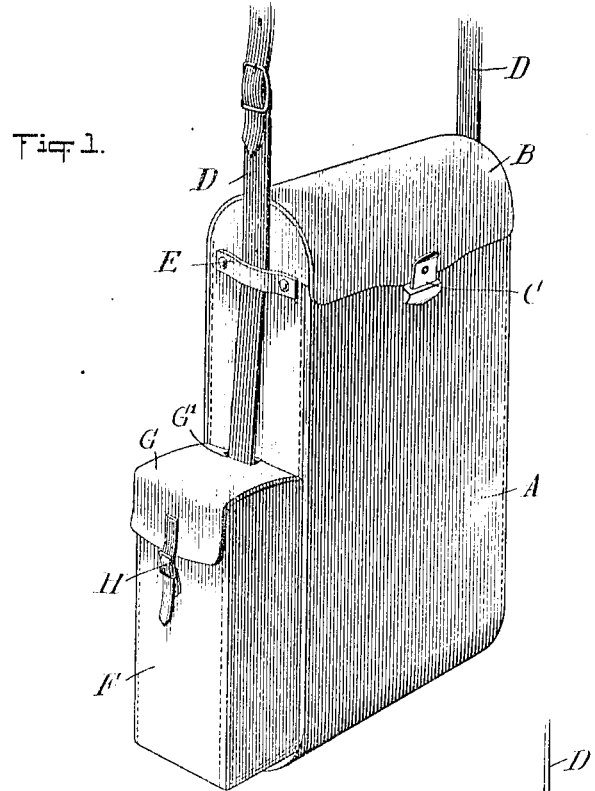
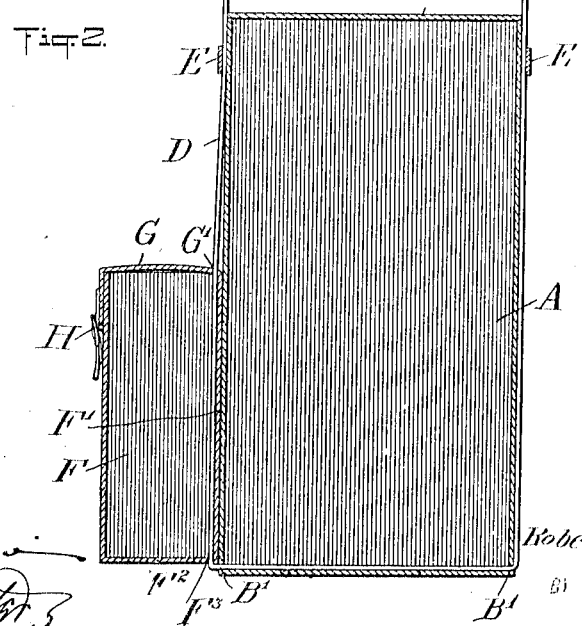

UNITED STATES PATENT OFFICE.

ROBERT R. LIVINGSTON, OF CLERMONT, NEW YORK.

COMBINED CAMERA-CASING AND FILM-CARRIER.

1,090,079.  Specification of Letters Patent.  Patented Mar. 10, 1914.

Application filed July 25, 1913. Serial No. 781,098.

*To all whom it may concern:*

Be it known that I, ROBERT R. LIVINGSTON, a citizen of the United States, and a resident of Clermont, in the county of Columbia and State of New York, have invented a new and Improved Combined Camera-Casing and Film-Carrier, of which the following is a full, clear, and exact description.

The invention relates to photographic cameras using roll films, and its object is to provide a new and improved combined camera casing and film carrier arranged to permit carrying extra films without increasing the size of the camera casing, and to allow convenient removal of a roll film from the film carrier whenever it is desired to use such film in the camera or for storing the exposed roll film in the carrier.

In order to accomplish the desired result use is made of a film-carrying receptacle of a width corresponding approximately to that of the casing containing the camera, the said receptacle having a cover hingedly connected with the back of the receptacle and which back fits against one side of the said camera casing, the said cover and the bottom of the receptacle having registering slots adjacent to the back of the receptacle for the passage of the carrying strap of the camera casing so as to hold the film-carrying receptacle in position on one side of the camera casing.

A practical embodiment of the invention is represented in the accompanying drawings forming a part of this specification, in which similar characters of reference indicate corresponding parts in both views.

Figure 1 is a perspective view of the combination camera casing and film-carrier; and Fig. 2 is a sectional side elevation of the same.

The camera casing A shown in the drawing is of the usual construction and is adapted to contain a kodak or a similar photographic camera. The casing A is preferably made of leather and is provided with a cover B forming an extension of the back of the casing. The front end of the cover B is adapted to be fastened to the front of the casing A by a suitable locking device C. The carrying strap D for the camera casing A extends through bearings E attached to the sides of the casing A near the upper ends thereof, and the bottom portion of the strap D extends through openings or slots B' formed in the sides of the casing A at the bottom thereof, as plainly indicated in Fig. 2. On one side of the camera casing A is held a film-carrying receptacle F preferably made of leather and of a width approximately corresponding to that of the casing A, the height of the receptacle F corresponding approximately to the length of the roll film so as to permit of conveniently storing such roll film in the receptacle F. The receptacle F is preferably made of leather and is provided with a cover G extending integrally from the back F' of the receptacle F, and the cover G is adapted to be fastened at its free end to the front of the receptacle F by a suitable fastening device H. The cover G and the bottom F² of the receptacle F are provided with slots or openings G', F³, respectively, located adjacent the back F' of the receptacle F, and through the said slots G', F³ passes one side of the carrying strap D so as to hold the receptacle F in position on the corresponding side of the camera casing A.

By the arrangement described, the film-carrying receptacle F is securely attached to one side of the camera casing A so that when the camera casing is carried by the user with the strap D slung over a shoulder then the film-carrying receptacle F does not form an undesirable projection on the casing A.

It will also be noticed that by arranging the film-carrying receptacle F on the outside of the camera casing A convenient access can be had to the films in the receptacle when it is desired to remove an unused film for use in the camera, or for storing an exposed film in the said receptacle.

Having thus described my invention, I claim as new and desire to secure by Letters Patent:

1. A combined camera casing and film carrier, comprising a camera casing, a carrying strap therefor, and a film-carrying receptacle having a cover adapted to be opened and closed for the insertion or removal of a film, the said receptacle having its back fitting onto one side of the camera casing, the said receptacle being held in place on the said camera casing by the said carrying strap engaging the said receptacle back to allow opening and closing of the said receptacle cover independent of the said carrying strap.

2. A combined camera casing and film carrier, comprising a camera casing, a carrying strap therefor extending along the sides of the said camera casing, and a film-carrying receptacle approximately corresponding to that of the said camera casing, the back of the said receptacle fitting against one side of the said camera casing, the said receptacle having a cover hingedly connected with the said back, the said cover and the bottom of the receptacle having registering slots adjacent the said back for the passage of the said carrying strap.

In testimony whereof I have signed my name to this specification in the presence of two subscribing witnesses.

ROBERT R. LIVINGSTON.

Witnesses:
 AMASA P. DISHER,
 EDWARD N. TAILER.